Nov. 8, 1966  C. L. PARKER  3,284,109

TAPPING SADDLE FOR POLYETHYLENE CABLE

Filed Aug. 24, 1964

CARL L. PARKER
INVENTOR.

BY Herbert J. Brown
ATTORNEY 3,284,109
TAPPING SADDLE FOR POLYETHYLENE CABLE
Carl L. Parker, Fort Worth, Tex., assignor to Malor Manufacturing, Inc., Fort Worth, Tex., a corporation of Texas
Filed Aug. 24, 1964, Ser. No. 391,648
1 Claim. (Cl. 285—197)

This invention relates to a combined tapping saddle and repair clamp for use on pressurized telephone cables having sheaths of synthetic resin such as polyethylene.

It has been the practice for some time to pressurize cables to prevent moisture from entering through small openings in the sheath until repairs could be made. Because the conductor wires in the cables have only thin coating insulators, usually tissue paper or thin plastic, even small amounts of moisture could cause shorting of electrical circuits. Until recently sheaths were of lead and repairs could be made by soldering or wiping with molten lead. Pressure gages could be applied by drilling small holes in the lead sheath and then soldering threaded fittings in place.

Telephone cables having plastic sheaths are now coming into wide use, and it is the primary object of the present invention to provide a satisfactory device for repairing and tapping such cables.

A particular object of the invention is to provide a tapping saddle for the described purpose which will not leak even though the connection with the sheath is not threaded or bonded.

Another object of the invention is to provide added sealing pressure around the hole in the sheath.

A further object of the invention is to provide a tapping stem which will not short conductor wires in a cable.

These and other objects will become apparent from the following description and the accompanying drawing, wherein.

Figure 1:
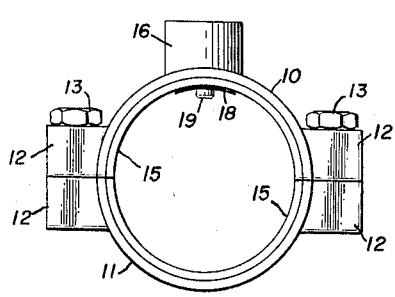
FIGURE 1 is an end elevational view of a combined tapping saddle and repair clamp according to the present invention.

The combined tapping saddle and repair clamp shown includes arcuate clamp members 10 and 11, referred to in the trade as C-flanges, and each member has ears 12 at its ends to receive bolts 13. The ears 12 of one member 11 are threaded, at 14, for receiving the bolt threads, not numbered. The inner arcuate surfaces of the members 10 and 11 are covered with sheets of resilient material 15, such as neoprene. It is to be noted that each sheet of resilient material 15 is of uniform thickness.

One of the arcuate members 10 includes an internally threaded fitting 16, which fitting is shouldered, at $a$, where it fits in a corresponding opening 17 in the said member. The fitting 16 is brazed or welded in place, not shown, or may be a cast integral part of the member 10.

Figure 3:
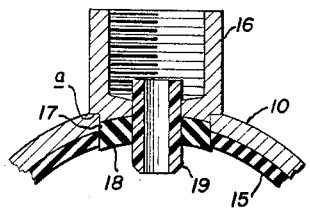
FIGURE 3 is an enlarged fragmentary transverse sectional view of one of the C-flanges and showing the fitting and the tapping stem therein.
Figure 2:
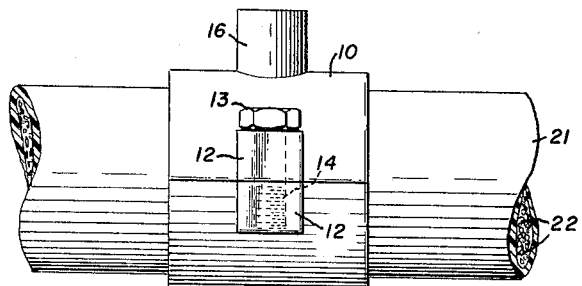
FIGURE 2 is a side elevational view of the invention illustrated in FIGURE 1, and showing the same applied to a telephone cable having a plastic sheath.
Figure 4:
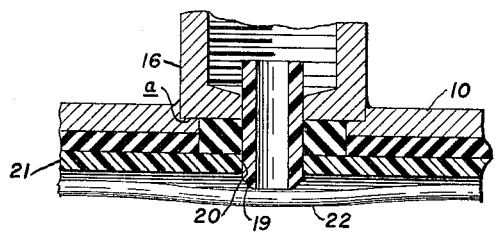
FIGURE 4 is a further enlarged fragmentary sectional view, taken at a right angle with reference to FIGURE 3, and showing the device applied to a telephone cable, the latter being shown in fragmentary longitudinal section.

As shown in FIGURES 3 and 4, the inner end of the fitting 16 extends only part way into the opening 17 so that the latter may additionally accommodate the end diameter of a resilient washer 18 of neoprene or the like, the exposed surface of which washer extends into the arc of the member 10 and projects beyond the surface of the resilient material 15. The inner end of the fitting 16 is curved, the arc of which is generated about the same point as the inner surface of the member 10.

A tubular stem 19 of nylon or similar material extends through the fitting 16 and the washer 18 and projects beyond the latter. The stem 19 may be pressed or otherwise secured in place.

Figure 5:
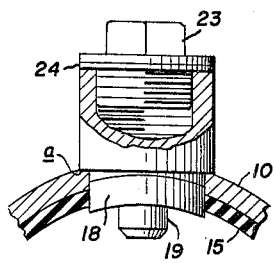
FIGURE 5 is a view similar to FIGURE 3, but showing a plug in the fitting as provided when the device is used as a repair clamp.

When used as a tapping saddle, a hole 20, the diameter of which is slightly less than the outside diameter of the stem 19, is drilled in the plastic sheath 21. The member 10 including the fitting 16 is placed over the hole and the end of the stem 19, which is beveled, is initially pressed in the hole 20 in the sheath 21. The remaining arcuate member is then placed around the remaining exposed surface of the sheath 21 and then the two members 10 and 11 are tightly secured by the bolts 13. Tightening of the bolts 13 presses the projecting end of the stem 19 into the sheath 21 and at the same time compresses the washer 18 around the sheath opening 20. If contact is made with conductor wires 22 in the sheath 21, no harm is done because the stem is of dielectric material. Pressure gages, not shown, or pressure supply lines may be readily connected to the fitting 16. As a repair clamp the device is placed over the leak in the cable and a plug 23 and washer 24 are provided for the fitting 16 as shown in FIGURE 5.

The invention is not limited to the exemplary construction herein shown and described, but may be made in various ways within the scope of the appended claim.

What is claimed is:

A saddle type clamp and tap for use on synthetic resin conduits comprising upper and lower substantially semi-cylindrical clamping members adapted to encircle said conduit, one of said members having a substantially centrally disposed aperture extending completely through the wall thereof, a fitting having a bore and a counter bore disposed in said aperture in fluid tight relation thereto, the end having said counter bore extending radially outwardly of the convex face of said one member, the inner end of said fitting containing the bore terminating short of the inner, concave wall of said one member forming thereby a shoulder with the walls of said aperture, resilient gasket means lining the inner concave surfaces of each of said clamp members, the lining in said one member having a coaxial aperture therethrough of a diameter substantially equal to the diameter of the aperture in said clamp, a nipple snugly engaging the walls of said bore and extending beyond the concave surface of the gasket on said one member a distance at least equal to the wall thickness of said conduit, and a resilient washer sealingly disposed around said nipple and in sealing engagement with the said shoulder and with the walls of the aperture in said gasket, and means to draw said clamp members together in tight embracing relation to said conduit.

(References on following page)

References Cited by the Examiner

UNITED STATES PATENTS

| | | | |
|---|---|---|---|
| 566,855 | 9/1896 | Friede | 285—197 |
| 982,028 | 1/1911 | Austin | 285—197 |
| 1,971,385 | 2/1931 | Skuttle | 285—197 X |
| 2,592,130 | 4/1952 | Erb | 285—47 |

FOREIGN PATENTS

| | | |
|---|---|---|
| 1,200,439 | 6/1959 | France. |
| 1,213,010 | 10/1959 | France. |
| 1,276,105 | 10/1960 | France. |

CARL W. TOMLIN, *Primary Examiner.*